US005987983A

United States Patent [19]

Ariav et al.

[11] Patent Number: 5,987,983

[45] Date of Patent: Nov. 23, 1999

[54] METHOD AND APPARATUS FOR MEASURING ACCELERATION

[76] Inventors: Aryeh Ariav, Cochav Michael 122, D.N. Hof Ashkelon; Vladimir Ravitch, Nitzanium 719/4, Ashkelon 78505, both of Israel

[21] Appl. No.: 09/051,459

[22] PCT Filed: Mar. 31, 1997

[86] PCT No.: PCT/IL97/00114

§ 371 Date: Jun. 23, 1998

§ 102(e) Date: Jun. 23, 1998

[87] PCT Pub. No.: WO97/37232

PCT Pub. Date: Oct. 9, 1997

[30] Foreign Application Priority Data

Apr. 1, 1996 [IL] Israel ........................................ 117767

[51] Int. Cl.[6] ........................................................ G01S 1/72

[52] U.S. Cl. ............................ 73/488; 702/141; 367/117; 367/129

[58] Field of Search .............................. 73/488, 492, 503, 73/510, 596, 597, 599, 1.37; 324/162; 702/141; 367/117, 129, 902

[56] References Cited

U.S. PATENT DOCUMENTS

| | | | |
|---|---|---|---|
| 4,094,306 | 6/1978 | Kossoff | 73/620 |
| 4,095,547 | 6/1978 | Benington | 73/510 |
| 4,408,290 | 10/1983 | Kubo et al. | 324/162 |
| 5,659,617 | 8/1997 | Fischer | 380/25 |

FOREIGN PATENT DOCUMENTS

| | | |
|---|---|---|
| 384 110 | 10/1987 | Austria . |
| 1 263 358 | 10/1961 | France . |
| 2 309 873 | 11/1976 | France . |
| 32 34733 A1 | 5/1983 | Germany . |
| 680 395 A5 | 8/1992 | Switzerland . |

*Primary Examiner*—Hezron Williams
*Assistant Examiner*—Helen C. Kwok
*Attorney, Agent, or Firm*—Oliff & Berridge, PLC

[57] ABSTRACT

A method and apparatus for measuring acceleration of a moving object. A body capable of transmitting pulses of energy is applied to the moving object, so as to be carried thereby and to move therewith. A pulse of the energy is transmitted in a forward direction from a first location on the body to a second location on the body at a known distance between the first and the second locations. The transmitted pulse is detected at the second location and the transit time of the pulse from the first location to the second location is measured. The measured transit time, together with the known distance between the first and the second locations, is utilized to determine the acceleration of the body and thereby of the moving object.

38 Claims, 3 Drawing Sheets

METHOD AND APPARATUS FOR MEASURING ACCELERATION

FIELD OF THE INVENTION

The present invention relates to a method and apparatus for measuring acceleration of a moving object.

BACKGROUND OF THE INVENTION

Acceleration (rate of change of velocity) is generally measured indirectly, by measuring the force exerted by, or restraints that are placed on, a reference mass to hold its position fixed in an accelerating body. Acceleration is computed using the relationship between restraint force and acceleration given by Newton's Second Law of Motion: the force is equal to the product of the mass and acceleration. Therefore, the precision by which acceleration can be determined is directly related to the precision by which force and mass can be measured.

SUMMARY OF THE INVENTION

An object of the present invention is to provide a novel method and apparatus for measuring acceleration, which method and apparatus are capable of very high precision and which are not subject to the above limitations.

According to one aspect of the present invention, there is provided a method of measuring acceleration of a moving object, comprising:

(a) applying to the moving object, so as to be carried thereby and to move therewith, a body capable of transmitting pulses of energy;

(b) transmitting a pulse of said energy in a forward direction, from a first location on the body in a second location on the body at a known distance from the first location;

(c) detecting the transmitted pulse at the second location;

(d) measuring transit time of the pulse from the first location to the second location; and (e) utilizing the measured transit time, together with the known distance between the first and second locations, for determining acceleration of the body and thereby of the moving object.

It will thus be seen that the novel method is not based on the conventional approach for measuring acceleration by measuring a force, but rather is based on measuring the transit time of an energy pulse. The basic mechanism of operation can be considered to be analogous to two persons at opposite ends of a moving train car spaced by a distance S throwing a ball between them. As long as there is no acceleration, i.e. the car is moving at constant velocity, the transit time T of the ball from one end to the opposite end will be constant. However, when the velocity changes, i.e. the train accelerates or decelerates, a receiver of the ball will appear to be farther (upon acceleration) or closer (upon deceleration) from a thrower of the ball by "virtual distance change" $\delta s$, which varies in magnitude and sign according to the acceleration. Thus, when the acceleration is positive in the direction in which the ball is thrown, the transit time T will be increased by $\delta t$ corresponding to the "virtual distance change" $\delta s$, and, when it is negative, it will be decreased by $\delta t$.

While the above method theoretically may be implemented by the use of electromagnetic pulses, it is particularly applicable when using the lower-velocity sonic pulses, and is therefore described below with respect to sonic pulses. In the above analogy, therefore, the ball corresponds to the sonic pulse. Although the transmission of a sonic pulse through a medium does not involve movement of mass particles through the medium in the same manner as in the ball analogy, it does involve movement of the energy of mass particles through the medium. Thus, as shown by the classical demonstration of Newton's Third Law of Motion ("to every action there is always an equal and opposite reaction") utilizing a line of suspended spherical balls in contact with each other, holding the first ball at one end of the line away from the next ball in the line, and releasing it to impact the next ball in the line, will produce an equal movement of the last ball at the opposite end of the line. The transmission of this energy from the first ball to the last ball is by a compressional, longitudinal (i.e. sonic) pulse. When the pulse is of electromagnetic energy, there is an analogous transmission of the energy through the body, although of course at a much higher velocity than the transmission of a sonic pulse.

As in the ball analogy, therefore, when a body is subjected to acceleration, a pulse transmitted through such a body will experience a transit time $t_B$ when not subjected to acceleration, an increased transit time $t_B+\delta t$ corresponding to the "virtual distance change" (VDC) factor $\delta s$ when subjected to acceleration, and a decreased transit time $t_B-\delta t$ decreased by the VDC factor when subjected to deceleration.

It will thus be seen that this method for measuring acceleration is effected by measuring time, namely the transit times of energy pulses, and not by measuring a force as in the conventional acceleration-measuring techniques. The measurement of time can be done much more precisely, particularly when using high-frequency digital techniques, than measuring force and mass, and therefore it will be seen that the novel method is inherently capable of much higher precision than the conventional acceleration-measuring techniques.

According to further features in the described preferred embodiments, a pulse is also transmitted in the reverse direction, from the second location to the first location, is detected at the first location, and its transit time is measured and also utilized in determining acceleration of the body and thereby of the moving object. As will be described below, the transmission of forward-direction and reverse-direction pulses tends to cancel the pulse velocity factor and also spurious signals such as resulting from changes in temperature, pressure, etc.

According to still further features in the described preferred embodiments, the known distance between the first and second locations is effectively multiplied by transmitting a plurality N of forward-direction pulses, and the same plurality N of reverse-direction pulses. Each forward-direction pulse is transmitted from the first location upon detection of the preceding forward-direction pulse at the second location, and each reverse-direction pulse is transmitted from the second location upon detection of the preceding reverse-direction pulse at the first location. The total transit times of the N forward-direction pulses, and the total transit times of the N reverse-direction pulses are measured and utilized, together with the known distance between the first and second locations multiplied by N, for determining acceleration of the body and thereby of the moving object.

The foregoing features, which enable the distance between the two locations to be effectively multiplied without limitation, enable even extremely low accelerations to be precisely measured.

According to further features in one of the described preferred embodiments, the pulse transmitting body is a cylindrically-shaped tube filled with a gaseous medium, preferably air, and sealed at both ends. The first location is at one end of the tube, and the second location is at the opposite end of the tube. The acceleration to be measured is thus a linear acceleration.

According to another preferred embodiment, the pulse transmitting body is a bent tube in the form of a ring, or spiral with connected ends, having first and second spaced pipes tangentially projecting from the ring. The first location is in the first pipe, and the second location is in the second pipe. The tube is filled with a fluid medium. The acceleration to be measured is thus an angular acceleration.

The invention also provides apparatus for measuring acceleration in accordance with the above method.

It will be appreciated that after acceleration has been measured, the same method and apparatus may also be used for measuring velocity by integrating the measured acceleration over a time interval, and also for measuring movement or displacement by integrating the measured velocity over the respective time interval.

BRIEF DESCRIPTION OF THE DRAWINGS

Further features and advantages of the invention will be apparent from the description below. The invention is herein described, by way of example only, with reference to the accompanying drawings, wherein.

DETAILED DESCRIPTION OF THE PREFERRED EMBODIMENTS

Figure 1:
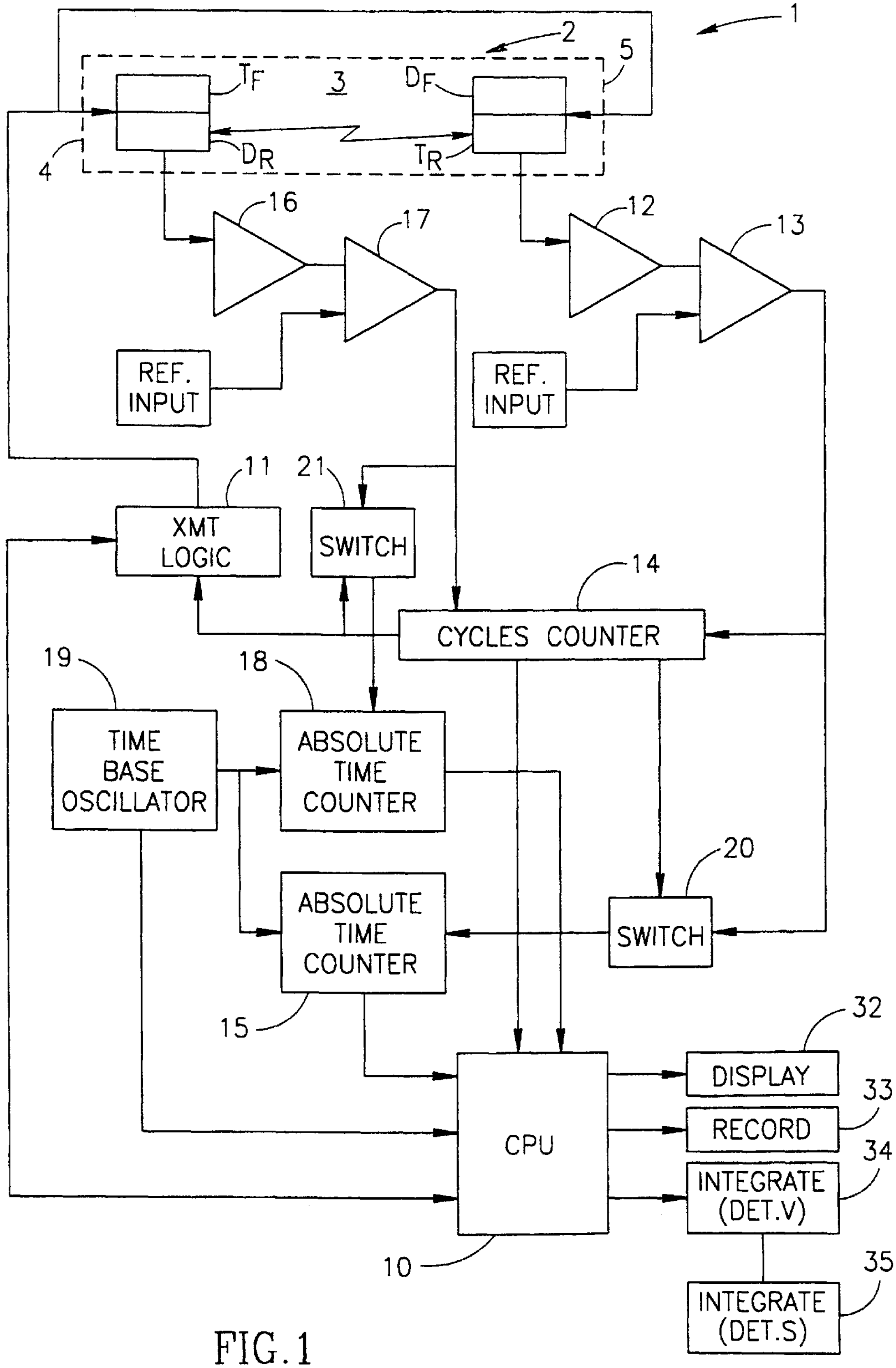
FIG. 1 is a block diagram illustrating the principal components of an apparatus for measuring acceleration in accordance with one preferred embodiment of the present invention.

Referring to FIG. 1, there is illustrated an apparatus, generally designated 1 which includes a body, generally at 2, capable of transmitting sonic pulses. In the present example, body 2 is in the form of a cylindrically-shaped tube. The tube is sealed at both its ends 4 and 5, and its interior 3 is filled with a gaseous medium, preferably air. End 4 of tube 2 includes a transmitter $T_F$ for transmitting forward-direction sonic pulses from end 4 to end 5 of the tube, and the latter end of the tube includes a sonic detector $D_F$ for receiving said forward-direction pulses. End 5 of tube 2 also includes a transmitter $T_R$ for transmitting reverse-direction sonic pulses from end 5 towards end 4 of the tube, and the latter end of the tube includes a detector $D_R$ for receiving the reverse-direction sonic pulses.

As will be described more particularly below, the sealed tube 2 is applied to and carried by a moving object, which is not specifically shown and which linear acceleration a is to be measured. The apparatus 1 directly measures the acceleration experienced by the sealed tube 2, and thereby also the acceleration of the moving object carrying the sealed tube 2. This measurement of acceleration is effected by transmitting forward-direction pulses from transmitter $T_F$ to detector $D_F$ at the opposite ends of tube 2, and also for transmitting reverse-direction pulses from transmitter $T_R$ to detector $D_R$, and measuring transit times of such forward-direction and reverse-direction pulses. The distance between the transmitters and detectors at the opposite ends of tube 2 is known with precision such that, as will be described more particularly below, the measured transit times, and the known distance between the transmitters and detectors at the opposite ends of tube 2, enable a precise determination to be made of the acceleration of the tube 2, and thereby of the moving object carrying this tube.

As illustrated in FIG. 1, the apparatus 1 further includes a processor, generally designated 10, which is connected via a transmitter logic circuit 11 to the forward-direction transmitter $T_F$ in end 4 of tube 2, to cause the latter transmitter to transmit forward-direction sonic pulses from end 4 of the tube towards the opposite end 5. Processor 10 is also connected via transmitter logic circuit 11 to the reverse-direction transmitter $T_R$ at end 5 of the tube causing that transmitter to transmit reverse-direction sonic pulses from end 5 towards end 4 of the tube 2. The forward-direction pulses detected by the detector $D_F$ are amplified in an amplifier 12, thresholded in a comparator 13, fed to a cycles counter 14, and also fed to an absolute time counter 15 through a switch 20. Similarly, the reverse-direction pulses detected by the detector $D_R$ at end 4 of the tube 2 are amplified in an amplifier 16, thresholded in a comparator 17, fed to the cycles counter 14, and also fed to another absolute time counter 18 through a switch 21. All these functional component are well known per se and, therefore, need not be described in detail.

Thus, the transit times of a certain number of the forward-direction sonic pulses from the transmitter $T_F$ to the detector $D_F$ are measured by the absolute time counter 15 which is controlled by a time base oscillator 19. Similarly, the transit times of the same number of the reverse-direction sonic pulses from the transmitter $T_R$ to the detector $D_R$ are measured by the absolute time counter 18 controlled by the same time base oscillator 19. The switches 20 and 21 are controlled by the cycles counter 14 in a manner to be actuated by the cycles counter 14 upon receiving by the latter the last pulse but one detected by the respective detector as described above. Each of the switches 20 and 21, when actuated by the cycles counter 14, operates the respective absolute time counter 15, 18 so as to, upon receipt of the last pulse, stop counting the clock pulses of the oscillator 19 and, thereby, define a transit time period T. The counts from counters 14, 15 and 18, as well as the clock pulses from the oscillator 19, are fed to the processor 10, which determines from this information the transit times of the forward-direction pulses from side 4 to side 5 of tube 2, and the reverse-direction pulses from side 5 to side 4 of tube 2. These transit times are used for determining the acceleration of the sealed tube 2 in the following manner.

When the tube 2 is moving at a constant velocity (i.e. at zero acceleration), the transit time T of the sonic pulses, both from $T_F$ to $D_F$ and from $T_R$ to $D_R$, will be constant, equal to the length $s_B$ of tube 2 divided by the velocity of sound v through the tube 2, i.e. $T=s_B/v$.

When the tube 2 experiences acceleration, for example in the direction of its forward-direction pulses (from side 4 to side 5), distance S appears to be increased by the VDC (virtual distance change) factor $\delta s$. If the acceleration is positive, the VDC factor will be positive $+\delta s$. If the acceleration is negative (deceleration), the VDC factor will be negative $-\delta s$.

Thus, the transit time T of a sonic pulse in either direction will be the transit time to traverse the sonic body $t_B$ (i.e. the length of the tube 2) plus the time $\delta t$, i.e. the transit time for traversing the "virtual distance change" $\delta s$ which, as described above, corresponds to the magnitude and direction of the acceleration. When the transit times of the forward-direction pulses and reverse-direction pulses are added, the time $\delta t$ is cancelled, leaving $2t_B$. That is, $$T_{sum}=(t_B+\delta t)+(t_B-\delta t)=2t_B \quad (1)$$

When the two transit times are subtracted, $t_B$ disappears, leaving $2\delta t$, that is:

$$T_{dif}=(t_B+\delta t)-(t_B-\delta t)=2\delta t \quad (2)$$

As described above, the VDC factor $\delta s$ is the distance passed by the body 2 over the transit time when the body experiences the acceleration a, and therefore:

$$\delta s=\tfrac{1}{2}a(t_B+\delta t)^2 \quad (3)$$

On the other hand, the sound pulse passes the same distance $\delta s$ during the additional period of time $\delta t$, that is:

$$\delta s=v\delta t \quad (4)$$

According to the above equations (3) and (4), the linear acceleration a can be estimated as follows:

$$a=\frac{2v\delta t}{(t_B+\delta t)^2} \quad (5)$$

Taking into consideration that $v=S_B/t_B$, we have:

$$a=\frac{2S_B\delta t}{t_B(t_B+\delta t)^2} \quad (6)$$

From the above, it can be seen that the acceleration a can be computed from the known length of the tube $s_B$ and the measured transit times T for the forward-direction and reverse-direction sonic pulse to traverse from one end to the opposite end of the tube. Thus, by adding the transit times of the forward-direction and reverse-direction pulses, the tube transit time $t_B$ (namely $2t_B$) is determined (Eq. 1). By subtracting the transit times of the forward-direction and reverse-direction sonic pulses, the VDC factor transit time $\delta t$ due to acceleration is determined (Eq. 2), this value being positive for acceleration and negative for deceleration.

Since the method is based on measuring the change in the transit time pulses due to the VDC factor (the "virtual distance change" in the length of the tube due to acceleration), the method could theoretically be implemented by measuring the change in transit time of only forward-direction sonic pulses. However, by measuring the transit times of both forward-direction and reverse-direction sonic pulses as described above, the computations are greatly simplified since they eliminate the velocity factor. Moreover, they tend to cancel the effects of spurious signals or those resulting from changes in temperature, pressure, etc.

Also, it is preferred to provide a plurality N of forward-direction pulses and a corresponding plurality of N reverse-direction pulses in order to increase the effective length of the tube and thereby the precision of the measurement. Thus, the effective length $s_B$ of the tube 2 can be multiplied by any desired number N, such as 10 or 100, or more, by transmitting N forward-direction pulses each being transmitted in the forward direction from the first location to the second location upon receipt of the preceding pulse at the second location, and by similarly transmitting N reverse-direction pulses, each being transmitted in the reverse direction from the second location upon receipt of the preceding pulse at the first location.

The following will describe one example of implementing the novel method. In this example, it will be assumed that tube 2 is of 20 cm in length and is filled with air, such that the sonic velocity within the tube is 340 M/sec, that is the transit time of sound through the tube would be 588.24 μsec.

Assuming that oscillator 18 has a clock frequency of 64 MHz, it will be seen that each clock is of $15.625\cdot10^{-9}$ seconds. For a 20 cm tube with travel time of 588.25 μsec, the cycles counter 14 will count to the value of $588.25\cdot10^{-6}\div15.625\cdot10^{-9}=37648$ for each cycle involving one forward-direction pulse and one reverse-direction pulse. If each measurement of acceleration utilizes sixteen forward-direction sonic pulses and sixteen reverse-direction sonic pulses, cycle counter 14 will count to 602368 cycles for each measurement of acceleration.

Thus, if there is no acceleration, the forward-direction pulse counter 15, and the reverse-direction pulse counter 18, will both count to the same value, 602368. This value represents the value $t_B$, namely the transit time of the sonic pulse for traversing the sonic body (i.e. tube 2) under zero acceleration. When there is acceleration, however, one counter will count $t_B+\delta t$, and the other counter will count $t_B-\delta t$, according to the magnitude and direction of acceleration, as described above. As also described above, since the distance $s_B$, namely the transit distance in the tube 2, is precisely known, determination of $t_B$ and $\delta t$ enables the processor 10 to compute the acceleration a per Equations (1), (2) and (9) above.

Figure 2:
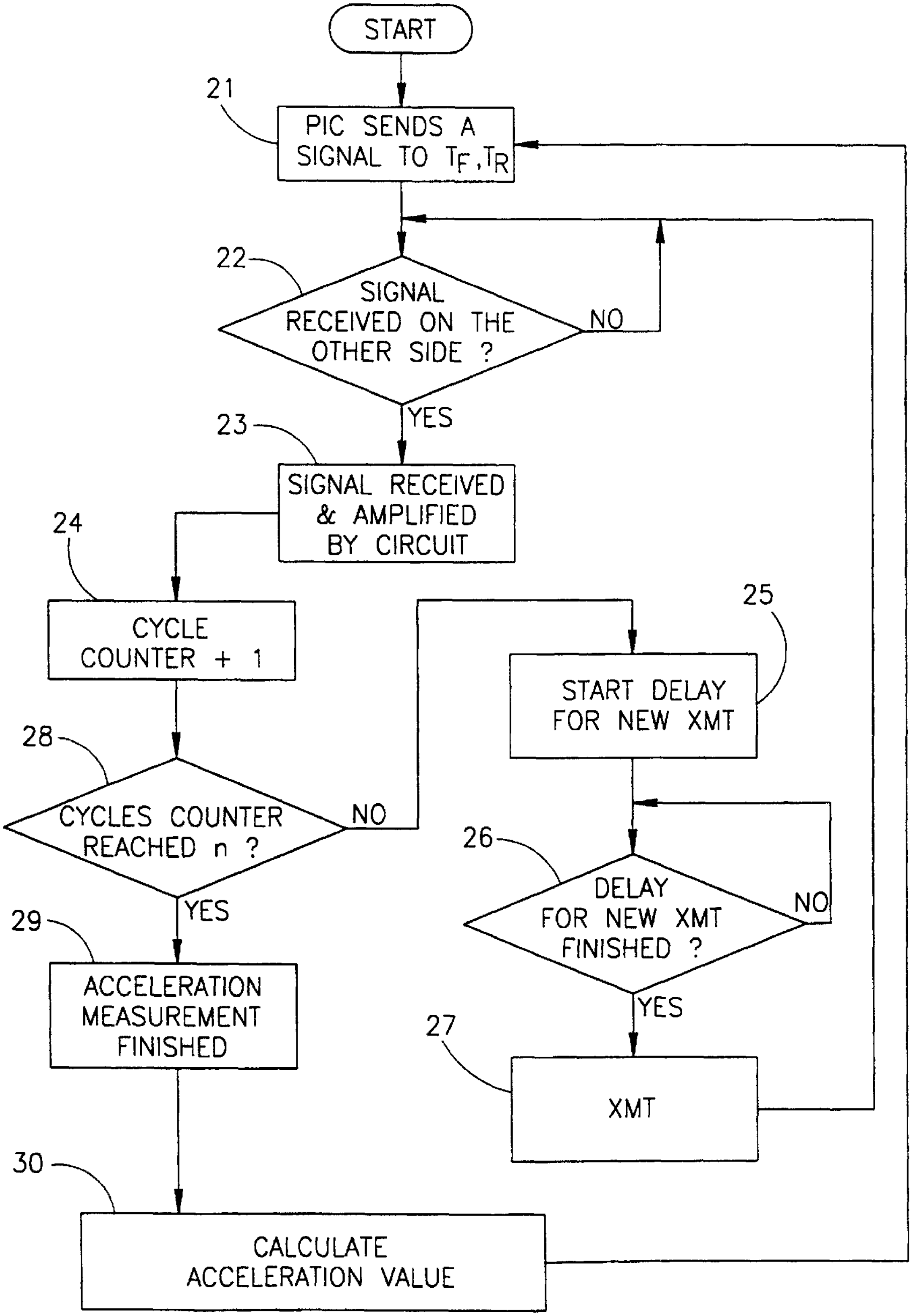
FIG. 2 is a flow chart illustrating the main steps of operation of the apparatus of FIG. 1.

FIG. 2 illustrates the overall operation of the system. Thus, the processor 10 transmits a signal via transmitter logic 11 to the forward-direction pulse transmitter $T_F$ and also to the reverse-direction pulse transmitter $T_R$ at the opposite ends of the tube 2 (block 21). When the sonic pulse is received by the respective detector, $D_F$ or $D_R$ (block 22), the signals generated by the detectors are amplified in the respective amplifier 12, 16 (block 23) and thresholded with respect to a reference voltage in their respective comparators 13, 17, to increment the cycles counter 14 (block 24). The processor 10 imposes a predetermined delay (blocks 25–27) after each pulse transmission before actuating the next pulse transmission in order to permit the transmitter to settle down after its previous transmission. The transit times of the forward-direction pulses are measured in the counter 15, and the transit times for the reverse-direction pulses are measured in the counter 18. A plurality N, 16 in the present example, of the forward-direction pulses are thus transmitted, in succession, each being transmitted from its transmitter $T_F$ from side 4 of tube 2 immediately upon detection of the preceding forward-direction pulse by detector $D_F$ in the opposite side 5 of the tube. A similar plurality N of reverse-direction pulses are also transmitted in succession by transmitter $T_R$ from side 5 of tube 2 each being transmitted immediately upon detection of the preceding reverse-direction pulse by detector $D_R$ at side 4 of the tube. The transit times of all the forward-direction pulses are accumulated in the counter 15, and the transit times of all the reverse-direction pulses are accumulated in the counter 18. When the predetermined number N of pulses have thus been transmitted and detected (block 28), the information from the counters 15 and 18, as well as that from the cycles counter 14, are processed in the processor 10, together with the known length $s_B$ of the tube 2, so as to calculate the acceleration a in the manner described above (blocks 29, 30).

After the processor 10 has determined acceleration, this value may be displayed on a screen 32 (FIG. 1), recorded as shown at 33, and/or further processed. Thus, the linear acceleration value calculated by the processor 10 may be integrated over a predetermined interval to determine velocity, as shown at 34, and may be further integrated to determine displacement or movement, as shown at 35.

Figure 3:
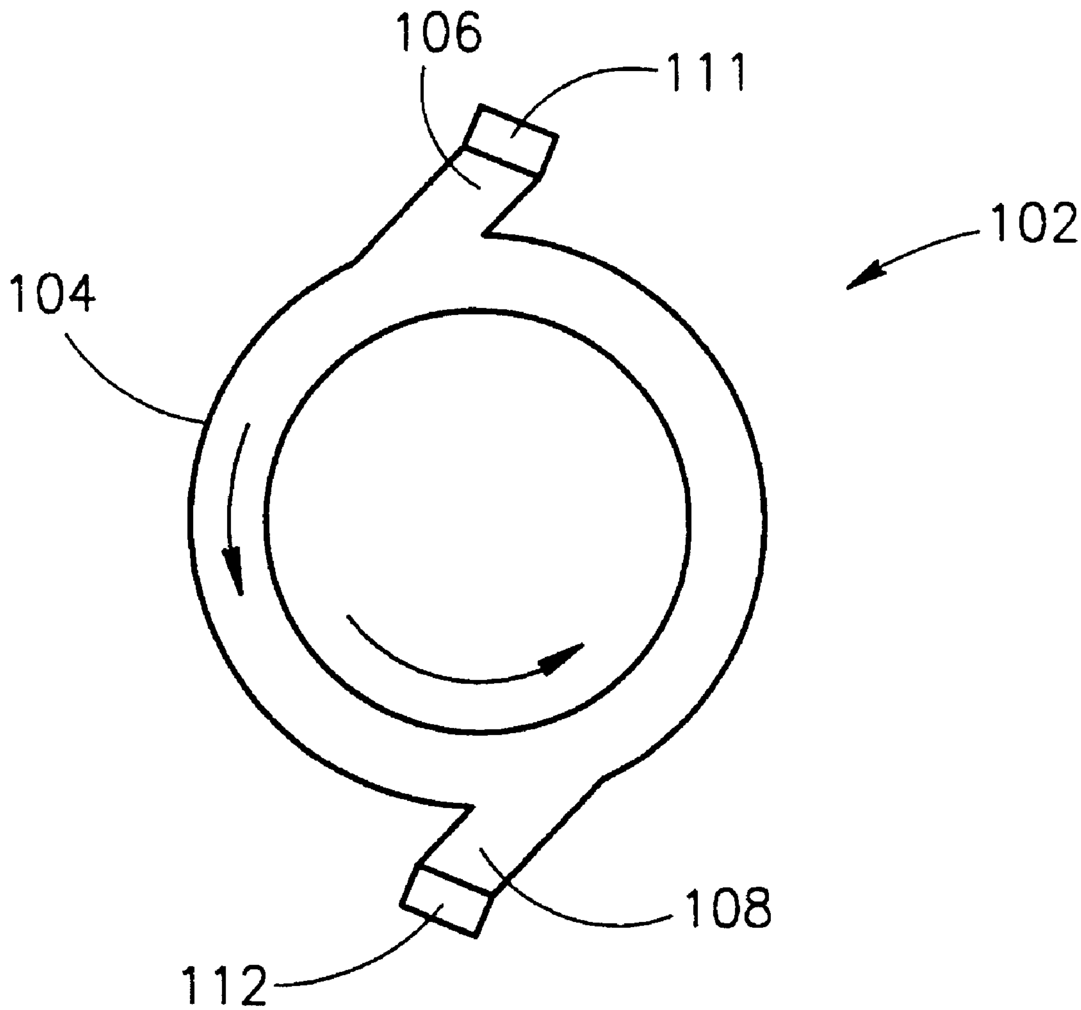
FIG. 3 is a schematic illustration of a body capable of transmitting sonic pulses according to another preferred embodiment of the invention.

Reference is now made to FIG. 3, illustrating another example of a body, generally at 102, capable of transmitting sonic pulses, which can be employed in the apparatus 1 for measuring an angular acceleration. The body 102 is formed of a main tube 104 and a pair of short tubes 106 and 108 connected to the main tube. The main tube 104 is configured like a ring. Alternatively, although not specifically shown, the main tube 104 may be designed like a spiral with connected ends. The tubes 106 and 108 form two projections from the main ring-shaped tube 104, being integrally made with the latter. In other words, each of the tubes 106 and 108 is an extension of the main tube 104. Similarly to the body 2 of the previously described example, the body 102 is filled with fluid, i.e. gas or liquid. A pair of sensors 110 and 112 are located inside the short tubes 106 and 108, respectively. It will be thus readily understood that such location of the sensors outside of the main tube 104 provides no intervention into the circulation of the fluid within the main tube 104.

Rotation of the body 102 with a constant angular speed for a relatively long period of time, causes rotation of the fluid's particles inside the tube with the same angular speed because of fluid's viscosity. Hence, there is no relative motion between the fluid and the sensors, and the transit times along the ring-shaped tube 104 in the two opposite directions are of equal values not depending on the values of speed. When the angular speed of the tube 102 changes, the fluid's particles start to move with another value of speed. This occurs after a short period of time which depends on the fluid's viscosity and mass due to inertia. It is appreciated, that the less mass and more viscosity, the shorter this period of time, i.e. response time. Thus, there appears a relative motion between the fluid and the sensors 110 and 112. Accordingly, the transit times in both directions become different, not equals and depend on a difference between the values of the angular speed of the fluid and the tube 104. Similarly, the faster the angular speed change (i.e. angular acceleration), the more the difference. Thus, the transit time between the sensors 106 and 108 depends on the angular acceleration of the ring-shaped tube 104. In order to calculate this angular acceleration A, a balance of forces should be considered. Thus, each layer of the fluid inside the tube is affected by two forces—friction and inertia. It is clear that gravity force should not be considered. Indeed, irrespectively of a spatial orientation of the body 102, the gravity force vector in the whole volume of fluid formed of a plurality of particles would be completely compensated. The friction force depends on the viscosity of the fluid and its relative speed, while the force of inertia depends on mass and acceleration. Therefore:

$$K_m \cdot \frac{d\,\omega_g}{d\,t} + K_v \cdot (\omega_g - \omega_r) = 0 \qquad (10)$$

where $K_m$ is a coefficient depending on the inertia; $K_v$ is a coefficient depending on the viscosity; $\omega_g$ is the angular speed of the fluid; and $\omega_r$ is the angular speed of the tube 102. When the angular acceleration A of the body 102 becomes constant during a long period of time, i.e. $A=d\omega_r/dt=\text{Const}$, the above differential equation (10) has the following solution:

$$\omega_g - \omega_r = A \cdot K_m / K_v \qquad (11)$$

This difference is measured by means of the transit times in the both opposite directions in the manner described above. The ratio $K_m/K_v$ characterizes a sensitivity of the apparatus 1, and may be determined during a calibration stage in a conventional manner using respective reference data.

Thus, considering the transit time T of a sonic pulse in both directions as described above, that is:

$$T_{sum} = \frac{S_B}{v}\left(1 + \frac{V_d}{v}\right) + \frac{S_B}{v}\left(1 - \frac{V_d}{v}\right) = \frac{2S_B}{v} \qquad (12)$$

$$T_{dif} = \frac{S_B}{v}\left(1 + \frac{V_d}{v}\right) - \frac{S_B}{v}\left(1 - \frac{V_d}{v}\right) = \frac{2S_B}{v} \cdot \frac{V_d}{v} = 2\delta t \qquad (13)$$

wherein $V_d$ is a linear speed of the fluid relative to the tube 102.

According to the above equations, the relative linear speed $V_d$ is as follows:

$$V_d = \frac{S_B \cdot \delta t}{t_B^2} \qquad (14)$$

Using the known mathematical dependence between angular and linear speeds of an object:

$$\omega_r - \omega_g = V_d / R$$

where R is a radius of the ring 104, and considering the above equations, the final value of the angular acceleration A can be calculated as follows:

$$A = \frac{(\omega_r - \omega_g)}{K_m} = \frac{K_v}{K_m} \cdot \frac{S_B \cdot \delta t}{R \cdot t_B^2} \qquad (15)$$

While the invention has been described with respect to the above preferred embodiments, it will be appreciated that this is set forth merely for purposes of example. Thus, since the described method can be implemented without dependency on the velocity of the pulse, the method theoretically could be practiced not only with respect to sonic pulses, and not only with respect to air or other gas bodies, but also with respect to liquid bodies. Many other variations, modifications and applications of the invention will be apparent.

We claim:

1. A method of measuring acceleration of a moving object, comprising the steps of:

(a) applying to the moving object, so as to be carried thereby and to move therewith, a body capable of transmitting pulses of energy.

(b) transmitting a pulse of said energy in a forward direction from a first location on said body to a second location on said body at a known distance from said first location;

(c) detecting the transmitted pulse at said second location;

(d) measuring transit time of the pulse from said first location to said second location; and (e) utilizing said measured transit time, together with said known distance between said first and second locations, for determining acceleration of the body and thereby of the moving object.

2. The method according to claim 1, wherein said pulse is a sonic pulse, and said body is one capable of transmitting pulses of sonic energy.

3. The method according to claim 1, further comprising the steps of:

transmitting a pulse of said energy in a reverse direction from the second location on said body to the first location on said body at the known distance from said first location;

detecting the transmitted pulse at said first location;

measuring transmit time of the pulse from said second location to said first location; and utilizing said measured transit time of the reverse direction, together with said measured transit time of the forward direction and the known distance between said first and second locations, for determining acceleration of the body and thereby of the moving object.

4. The method according to claim 1, wherein the known distance between said first and second locations is effectively multiplied by:

transmitting a plurality N of the pulses in said forward direction successively from said first location to said second location, each pulse being transmitted from said first location upon detection of the preceding pulse at said second location;

measuring total transit times of said N pulses in the forward direction, and utilizing said measured total transit times, together with said known distance between said first and second locations multiplied by N, for determining acceleration of the body and thereby of the moving object.

5. The method according to claim 3, wherein the known distance between said first and second location is effectively multiplied by:

transmitting a plurality N of the pulses in said forward direction and a same plurality N of said pulses in said reverse direction, each forward direction pulse being transmitted from said first location upon detection of the preceding forward direction pulse at said second location, and each reverse direction pulse being transmitted from said second location upon detection of the preceding reverse direction pulse at said first location;

measuring total transmit times of said N forward direction pulses;

measuring total transmit times of said N reverse direction pulses; and utilizing the measured total transit times of the forward direction pulses and the reverse direction pulses, together with said known distance between said first and second locations multiplied by N, for determining acceleration of the body and thereby of the moving object.

6. The method according to claim 1, wherein said transit time is measured by counting a number of clock pulses produced by a high-frequency oscillator during the respective time.

7. The method according to claim 1, wherein the steps set forth are periodically repeated during a time interval for periodically measuring the acceleration of the moving object, and the measured acceleration is integrated over said time interval for determining velocity of the moving object.

8. The method according to claim 7, wherein the determined velocity of the moving object is further integrated over said time interval for determining displacement of the moving object during said time interval.

9. The method according to claim 1, wherein said acceleration to be determined is a linear acceleration of the object.

10. The method according to claim 9, wherein said body capable of transmitting pulses is a cylindrically-shaped tube filled with a gaseous medium and sealed at both ends, said first location being at one end of said tube, and said second location being at the opposite end of said tube.

11. The method according to claim 3, wherein the transit times of the pulses transmitted in the forward and reverse direction, and said known distance which is designated as $S_B$ are utilized to determine said acceleration by:

adding the transit time of the pulse transmitted in said forward direction with the transit time of the pulse transmitted in said reverse direction to produce a value $2t_B$ which is equal to twice a transit time $t_B$ of the pulses through the body when there is no acceleration;

subtracting the transit time of the pulse transmitted in said forward direction from the transit time of the pulse transmitted in said reverse direction to produce a value 2 t equal to twice the change in a transit time t of the pulses due to acceleration; and determining acceleration a according to the following equation:

$$a = \frac{2S_B\delta t}{(t_B(t_B + \delta t))^2}$$

12. The method according to claim 10, wherein said tube is filled with air.

13. The method according to claim 1, wherein said acceleration to be determined is an angular acceleration.

14. The method according to claim 13, wherein said body capable of transmitting pulses is a vessel formed of a main tube filled with a fluid medium and having a first and a second short tubes integrally made with said main tube and projecting therefrom, said first location being in said first short tube, and said second location being in said second short tube.

15. The method according to claim 14, wherein said main tube is in the form of a ring.

16. The method according to claim 14, wherein said main tube is in the form of a spiral with connected ends.

17. The method according to claim 14, wherein a transit time $t_B$ of the pulses through the body when there is no acceleration, a change in the transit time $\delta t$ of the pulses due to acceleration, the known distance is $S_B$, a known radius R of the main tube and a known sensitivity $K_w/K_m$ of the body are utilized to determine said angular acceleration A according to the following equation:

$$A = \frac{K_v}{K_m} \cdot \frac{S_B \cdot \delta t}{R \cdot t_B^2}$$

18. The method according to claim 14, wherein said fluid medium is gas.

19. The method according to claim 14, wherein said fluid medium is liquid.

20. An apparatus for measuring acceleration of a moving object, comprising:

a body capable of transmitting energy pulses to be carried by said object so as to move therewith;

a pulse transmitter at a first location on the body for transmitting pulses of said energy in a forward direction from said first location to a second location on the body at a known distance from said first location;

a pulse detector at said second location on the body;

a measuring system for measuring the transit time of pulses from said first location to said second location; and a processor controlling said transmitter, controlled by said detector, and utilizing said measured transit time together with said known distance between said first and second locations, for determining acceleration of the body and thereby of the moving object.

21. The apparatus according to claim 20, wherein said pulse transmitter is a sonic pulse transmitter.

22. The apparatus according to claim 20, further comprising a pulse transmitter at said second location on the body for transmitting reverse direction pulses therefrom to said first location, and a pulse detector at said first location on the body for detecting said reverse direction pulses, said measuring system also measuring transit time of said reverse direction pulses from said second location to said first location, and said processor also controlling said transmitter transmitting said reverse direction pulses, being controlled by said detector detecting said reverse direction pulses, and also utilizing said measured transit time of the reverse direction pulses for determining acceleration of the body and thereby of the moving object.

23. The apparatus according to claim 20, wherein said processor controls said transmitter of forward-direction pulses to transmit a plurality N of said forward-direction pulses successively from said first location to said second location, each pulse being transmitted from said first location upon detection of the preceding pulse at said second location;

wherein said measuring system measures the total transit times of said N forward-direction pulses; and wherein said processor utilizes said measured total transit times, together with said known distance between said first and second locations multiplied by N, for determining the acceleration of the body and thereby of the moving object.

24. The apparatus according to claim 22, wherein said processor controls said forward-direction transmitter to transmit a plurality N of said forward-direction pulses successively from said first location to said second location each being transmitted from said first location upon detection of the preceding forward-direction pulse at said second location, and also controls said reverse-direction transmitter for transmitting the same plurality N of said reverse-direction pulses successively from said second location to said first location, each being transmitted from said second location upon detection of the preceding reverse-direction pulse at said first location;

wherein said measuring system measures the total transit times of said N forward-direction pulses, and the total transit times of said N reverse-direction pulses; and wherein said processor utilizes said total transit times of said forward-direction pulses and said total transit times of said reverse-direction pulses, together with said known distance between said first and second locations multiplied by N, for determining the acceleration of the body and thereby of the moving object.

25. The apparatus according to claim 20, wherein said measuring system includes a high frequency oscillator generating clock pulses, and a counter counting a number of clock pulses produced during the respective transit times measured.

26. The apparatus according to claim 20, wherein said processor determines the acceleration of the moving object periodically for a predetermined time interval, and integrates said determined acceleration over said time interval to determine velocity of the moving object at the end of said time interval.

27. The apparatus according to claim 26, wherein said processor integrates said determined velocity over said time interval to determine the displacement of said moving object during said predetermined time interval.

28. The apparatus according to claim 20, wherein said acceleration to be measured is a linear acceleration of the object.

29. The apparatus according to claim 28, wherein said body capable of transmitting said pulses is a cylindrically-shaped tube filled with a gaseous medium and sealed at both ends, said first location being at one end of said tube, and said second location being at the opposite end of said tube.

30. The apparatus according to claim 22, wherein said processor utilizes the transit times of the forward direction pulses and the reverse direction pulses, and said known distance which is $S_B$, to determine said acceleration by:

adding the transit time of the forward direction pulses with the transit time of the reverse direction pulses to produce a value $2t_B$ which is equal to twice a transit time $t_B$ of the pulse through the body when there is no acceleration;

subtracting the transit time of the forward direction pulses from the transit time of the reverse direction pulses to produce a value 2 t equal to twice the change in a transit time t of the pulses due to acceleration; and determining linear acceleration a according to the following equation:

$$a = \frac{2S_B\delta t}{t_B(t_B + \delta t)^2}$$

31. The apparatus according to claim 29, wherein said tube is filled with air.

32. The apparatus according to claim 20, wherein said acceleration to be determined is an angular acceleration.

33. The apparatus according to claim 32, wherein said body capable of transmitting pulses is a vessel formed of a main tube filled with a fluid medium and having a first and a second short tubes integrally made with said main tube and projecting therefrom, said first location being in said first short tube, and said second location being in said second short tube.

34. The apparatus according to claim 33, wherein said main tube is in the form of a ring.

35. The apparatus according to claim 33, wherein said main tube is in the form of a spiral with connected ends.

36. The apparatus according to claim 22, wherein said processor utilizes a transit time $t_B$ of the pulses through the body when there is no acceleration, a change in a transit time t of the pulses due to acceleration, said known distance is $S_B$, a known radius R of the main tube and a known sensitivity $K_m/K_v$ to determine said angular acceleration A according to the following equation:

$$A = \frac{K_v}{K_m} \cdot \frac{S_B \cdot \delta t}{R \cdot t_B^2}$$

37. The apparatus according to claim 33, wherein said fluid medium is gas.

38. The apparatus according to claim 33, wherein said fluid medium is liquid.

* * * * *